Patented May 19, 1931

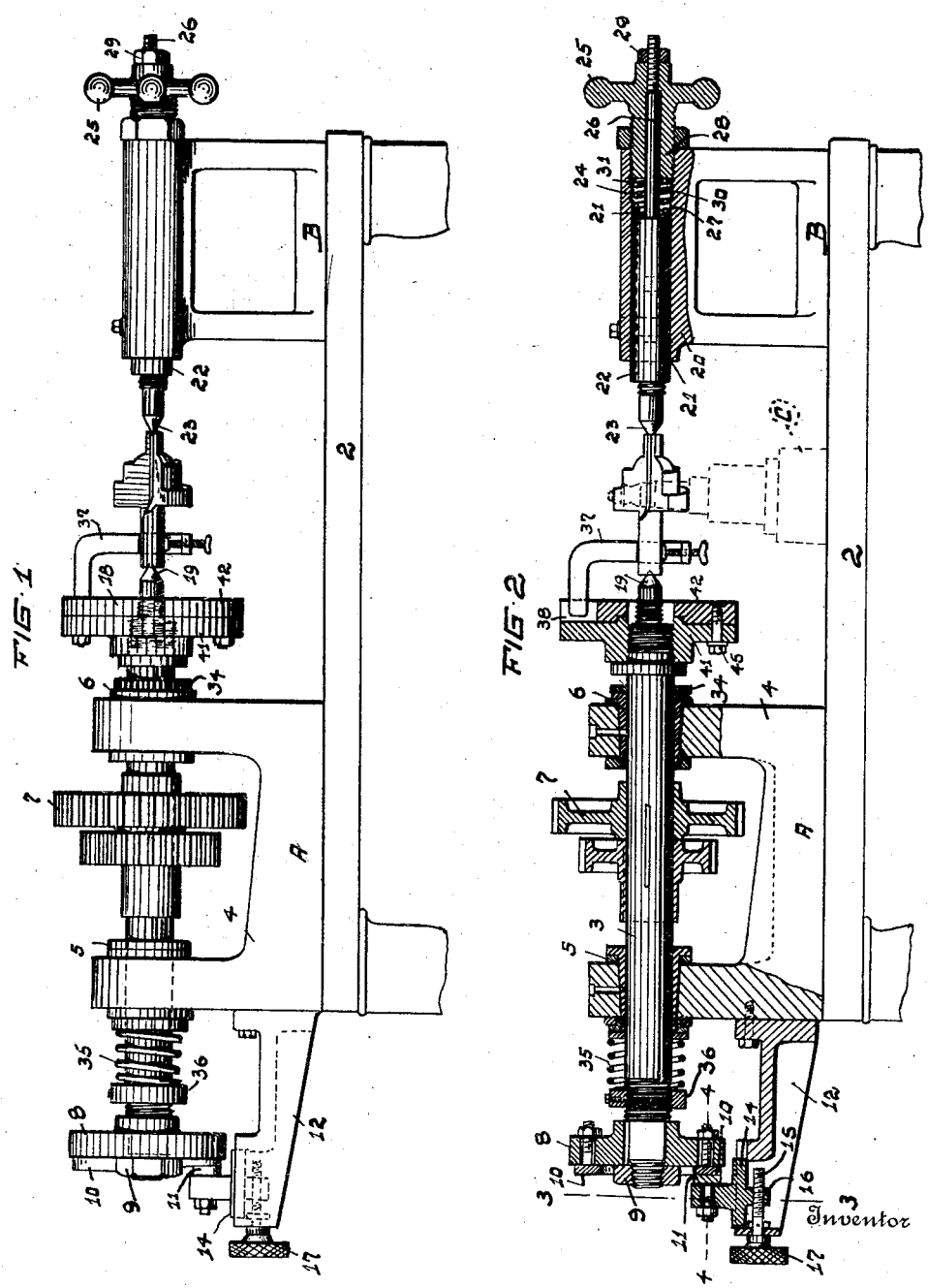

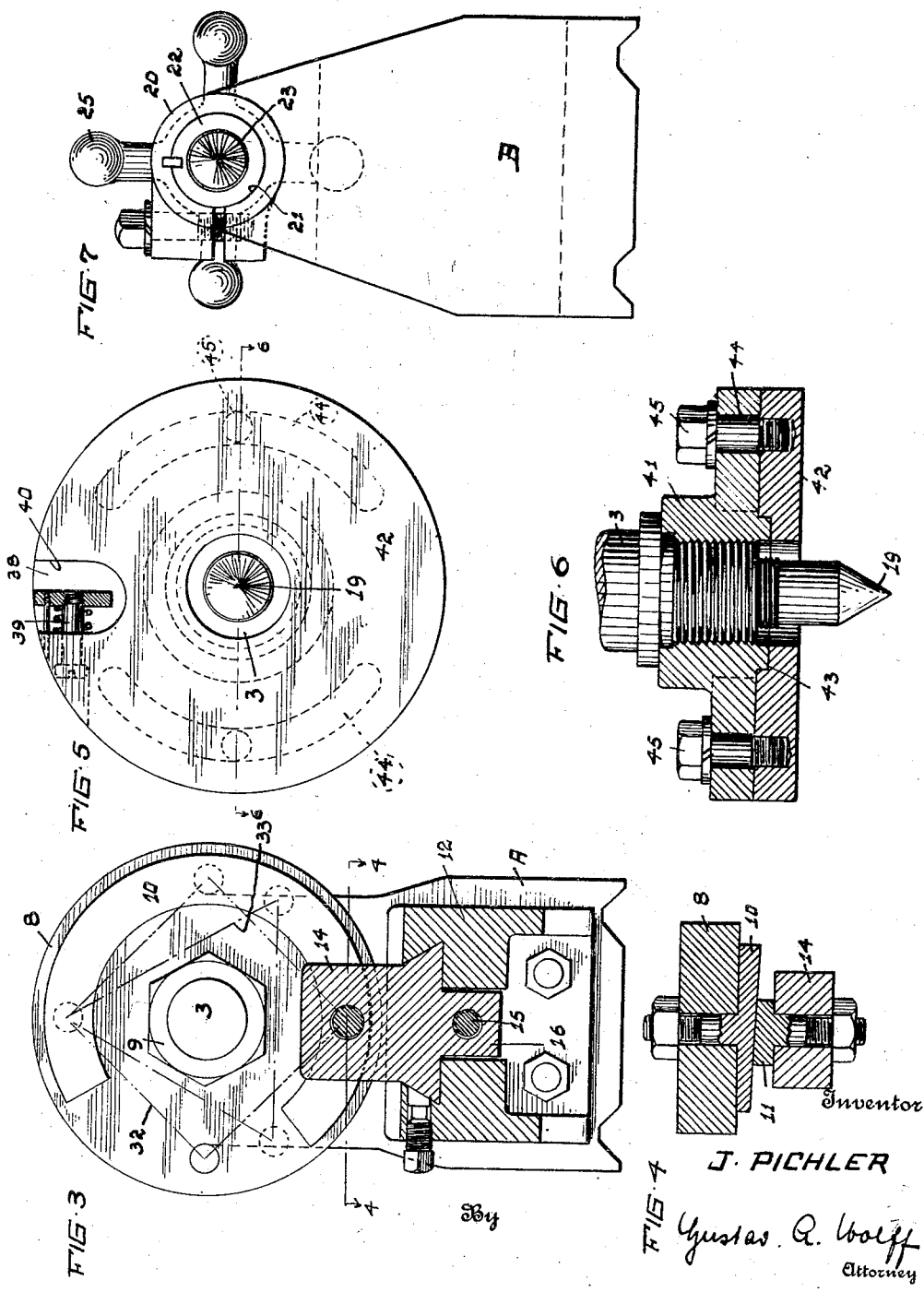

1,806,562

UNITED STATES PATENT OFFICE

JOHN PICHLER, OF CLEVELAND, OHIO

AUTOMATIC TOOL CUTTING MACHINE

Application filed November 1, 1928. Serial No. 316,399.

My invention relates to an automatic tool cutting machine for cutting tools such as boring cutters, seating tools, roughing cutters, etc., and more particularly to a machine adapted to undercut single or plural fluted cutting tools of the described kind, as extensively used in turret lathe work. The primary object of my invention is a new and simple machine adapted to automatically undercut such tools to form the proper top rake angle for the tool (for steel about 16°) which angle also is called the clearance angle, and which angle should be equal for each tooth of the tool to permit proper and easy resharpening by grinding. Such an object, according to my invention, is achieved by a machine in the form of a specially designed lathe, so constructed that the tool to be cut rotates in front of a cutting steel, held in a rigid but adjustable tool post and in which during each rotation the tool is axially and periodically reciprocated with respect to the cutting steel. Such shifting or reciprocating permits proper and automatic cutting of the desired top rake angle by the rigidly held cutting steel.

More specifically, according to my invention the shifting of the tool to be cut is induced by axial shifting of the main or headstock spindle and the tailstock spindle of the lathe, which spindles according to general practice support the tool axially and rotatably between their centers. Both spindles are according to the invention longitudinally slidably supported in bearings and special means are provided to induce a timed reciprocating sliding movement of these spindles. The above and other objects in view, my invention consists furthermore in other features of construction set forth in the following specification and as illustrated in the accompanying drawings.

Referring to the figures of the drawings:

Fig. 1 is a side view and Fig. 2 a sectional view of an exemplified form of the invention showing a lathe of special design with the tool to be cut between the centers of the headstock and tailstock spindles, the tool post supporting the cutting steel is omitted in Fig. 1 and shown in dotted lines in Fig. 2. Fig. 3 is a sectional view on line 3—3 of Fig. 2 and Fig. 4 a sectional view on line 4—4 of Fig. 3. Fig. 5 is a face view of the face plate of the headstock and Fig. 6 a sectional view on line 6—6 of Fig. 5. Fig. 7 is a front view of the tailstock.

The machine in general shape and form resembling a lathe, includes a main frame or lathe bed 2 of any desired design supporting a headstock, A, rigidly connected therewith, a tailstock B longitudinally adjustably secured to said frame, and a tool post C of general form, shown in dotted lines in Fig. 2 for rigid support of a cutting steel. In headstock A a spindle 3 is rotatably and axially slidably confined in a frame member 4 forming two bearings 5 and 6 so that said headstock spindle 3 rotated by gear 7 in any suitable manner, may be axially shifted or reciprocated during rotation. Outer end of spindle 3 bears a cam disk 8 screwed upon said spindle and locked by nut 9 and this disk 8 supports on its outer face an exchangeable cam member 10 rigidly screw-connected to said plate. Cam member 10 cooperates with a cam member 11, exchangeably and horizontally adjustable and supported upon an extension 12 attached to or forming an integral part of frame 4 of headstock A. To permit horizontal adjustment of cam member 11, same is mounted upon a slide 14 within extension 12 movable by a screw member 15, engaging a downwardly extending ear 16 of slide 14 and bearing at its front end a knurled collar 17 for its operation. It may be seen that during rotation of spindle 3 the cooperation of cam members 10 and 11 push said spindle towards the right. The other end of spindle 3 supports a face plate 18 and extends into a center 19 in the usual way.

Now referring to the tailstock B, the frame or body 20 thereof is adjustably mounted in the usual way upon frame 2. Longitudinally through body 20 extends a cylindrical aperture 21 in which is mounted slidably but non-rotatably a support or spindle 22 having the usual taper socket at one end to receive a center 23 in the usual manner. The rear end 24 of aperture 21 is screw-threaded for engagement with an adjusting hand wheel 25 for adjusting spindle 22 and thereby center 25 and this adjusting wheel is yieldingly connected with said spindle 22 to permit shifting of said spindle without interfering with the position of wheel 25 for a purpose later to be described. Such yielding connection is achieved by a rearward and reduced extension 26 of spindle 22 forming a shoulder 27 at spindle 22. This extension is screw-threaded at its rear end, extends through an axial bore in wheel 25 and its hub portion 28, and bears a nut 29 preventing disengaging of wheel 25 therefrom. A stiff spring member 30 is inserted between shoulder 27 of spindle 22 and front face 31 of hub portion 28 which can readily be tensioned by adjustment of nut 29. If the tool to be cut is inserted between the two centers 19 and 23 and spindle 3 rotated the cooperation of cam members 10 and 11 pushes spindle 3 and thereby the tool and spindle 22, towards the right against the tension of stiff spring member 30 and as soon as the cam members have passed each other spring 30 pushes spindle 22 and thereby the tool to be cut and spindle 3 in opposite direction, so that during one revolution of spindle 3 both spindles and therewith the tool is reciprocated according to the number of cams 10 used on cam disk 8. In the drawing only one cam member is shown, but it is obvious that a plural number of cams may be used and for that purpose different holes connected by lines 32 and 33 are provided in cam disk 8. It is obvious that the shifting of the tool is proportional to the shape of the cams, so that by change in shape of the cams the size of the clearance angle may be readily changed.

To avoid knocking of the machine during operation, I prefer the use of a leather washer 34 acting as a silencer or bumper. A light spring 35 on spindle 3 supported against frame member 4 forces spindle 3 and thereby cam disk 8 always towards the left in its proper working position and this spring 35 can be tensioned by a nut 36 screw-connected with spindle 3.

To drive the tool to be cut by face plate 18 a lathe dog 37 clamped to the tool engages a slot 38 in face plate 18 and in order that cam disk 8 and lathe dog 37 stay in the adjusted position a spring pressed plunger 39 arranged within slot 38 forces the lathe dog always in engagement with the driving side 40 of slot 38.

For proper and quick adjustment of the tool to be sharpened with respect to cam disk 8 face plate 18 is vertically split in two parts 41, 42, rotatably adjustable with respect to each other. Part 41 is rigidly connected to spindle 3 and supports parts 42 centrally upon a hub portion 43 and is furthermore provided with slots 44 engaged by clamping screws 45 screwed into part 42, which latter contains the slot 38 referred to above. By this arrangement arrangement after centering the tool and with lathe dog 37 in slot 38 the tool may be readily adjusted with respect to cam members 10 on disk 8 by loosening of screws 45 and turning of part 42 with respect to part 41.

It is to be understood that the device as shown is considered to be an exemplified form of my invention and that changes thereof may readily be made without departing from the scope of the invention.

What I claim, is:

1. An automatic tool cutting machine, comprising a headstock, a headstock spindle rotatably and axially slidably supported within said headstock, a tailstock, a spindle slidably supported within said tailstock, means on said headstock to axially shift said spindles in one direction when a work piece is inserted between said spindles, and means within said tailstock and actuating upon said tail spindle to yieldingly shift said spindles in the opposite direction.

2. In an automatic tool cutting machine, a headstock having an extension at one side thereof, adjustable means supporting a cam member, on said extension, a spindle rotatably and axially slidably confined within said headstock, a cam disk affixed to one end of said spindle and cooperating with said cam for axial shifting of said spindle during rotation thereof, a tailstock, a spindle slidably supported within said tailstock, and yielding means within said tailstock forcing said cam disk in contact with said cam member.

3. In an automatic tool cutting machine, a headstock, a headstock spindle axially slidable within said headstock, cooperating cam members mounted on said spindle and said headstock respectively, a tailstock, a tailstock spindle axially slidably mounted within said tailstock, a shifting member for said tailstock spindle, a heavy compression spring within said tailstock actuating upon said tailstock spindle and forcing said cam members in engagement when a work piece is inserted between said two spindles.

4. In an automatic tool cutting machine, according to claim 3, a light compression spring encircling said headstock spindle and co-acting with said headstock to hold said cam members in engagement when no work piece is present between said headstock spindle and said tailstock spindle.

5. An automatic tool cutting machine, comprising a headstock, a headstock spindle rotatably and axially slidably mounted within said headstock, a tailstock, a spindle slidably supported within said tailstock, means coacting with said headstock spindle to axially tilt said spindles in one direction when a work piece is inserted between said spindles and means coacting with said tailstock spindle for yielding shifting of said spindles in the opposite direction.

6. An automatic tool cutting machine, comprising a headstock, a headstock spindle axially slidably mounted within said headstock, a tailstock, a spindle slidably supported within said tailstock, adjustable means coacting with said headstock spindle to axially shift said spindles in one direction when a work piece is inserted between said spindles, yielding means coacting with said tailstock spindle for yieldingly shifting said spindles in the opposite direction, and adjusting means for said yielding means.

In testimony whereof I affix my signature.

JOHN PICHLER.